Jan. 5, 1932.  A. G. BOWEN  1,839,195
GEAR DIFFERENTIAL
Filed April 18, 1929  2 Sheets-Sheet 1
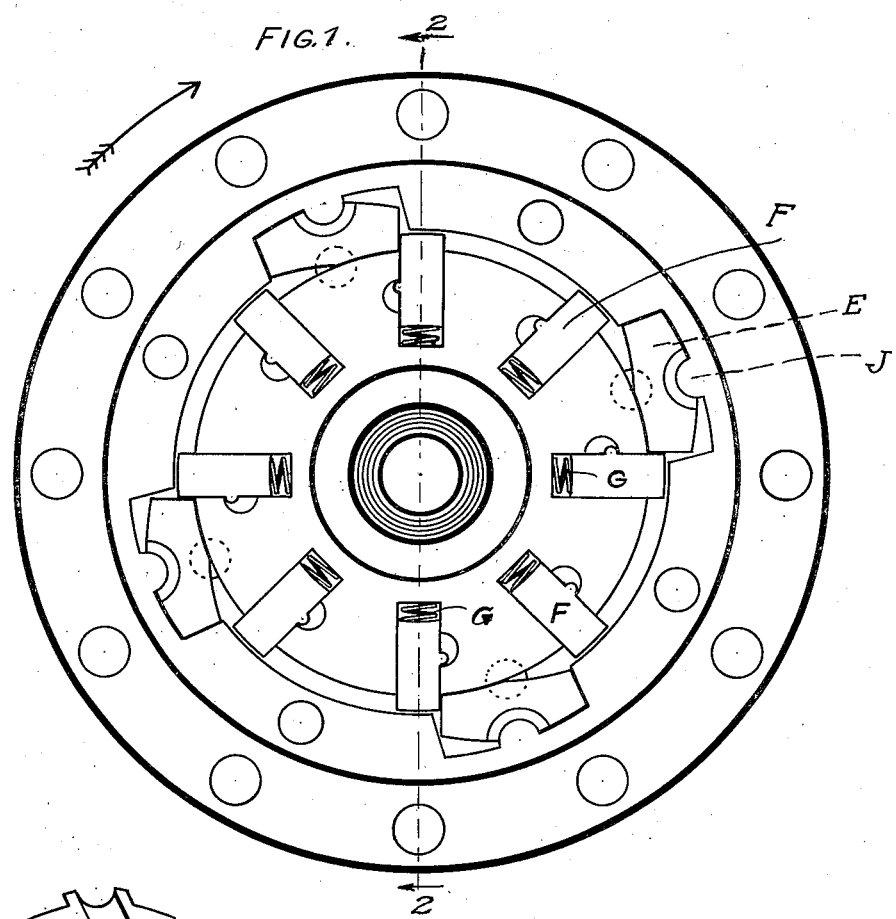
FIG.1.
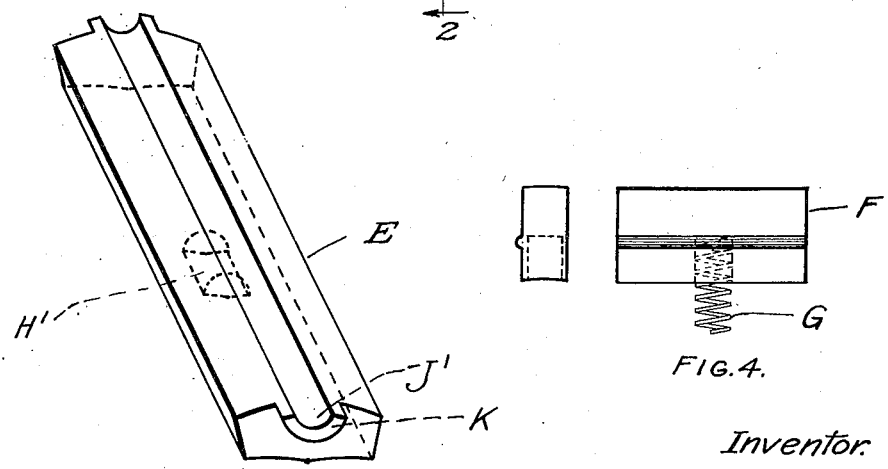
FIG.3.
FIG.4.
Inventor.

Jan. 5, 1932.　　　A. G. BOWEN　　　1,839,195
GEAR DIFFERENTIAL
Filed April 18, 1929　　2 Sheets-Sheet 2
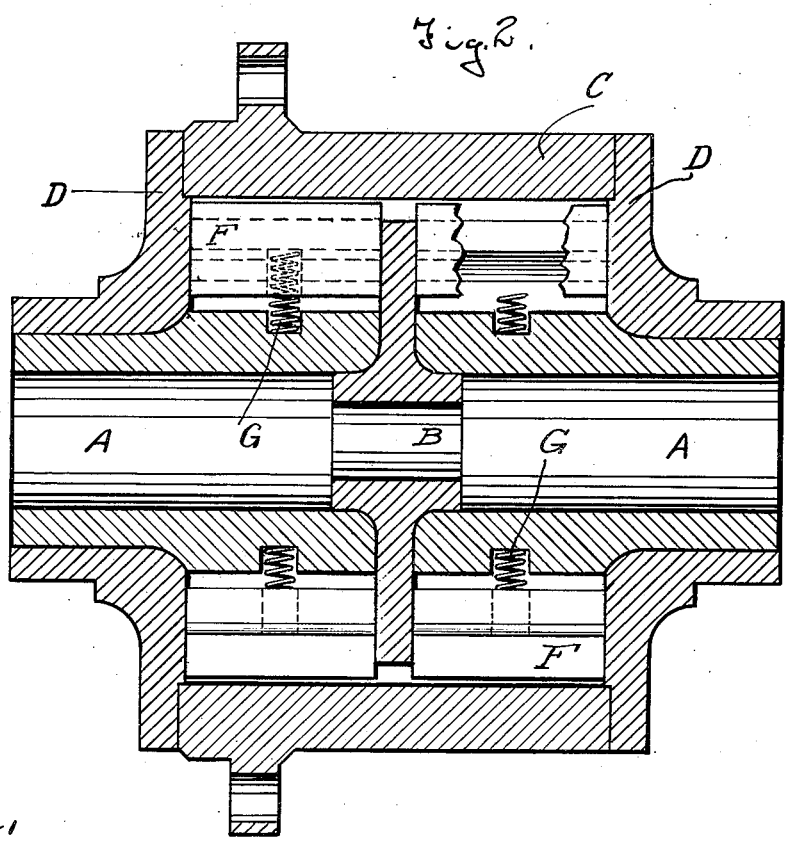
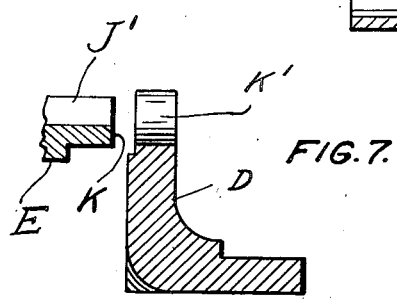
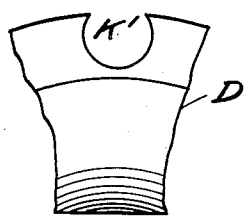
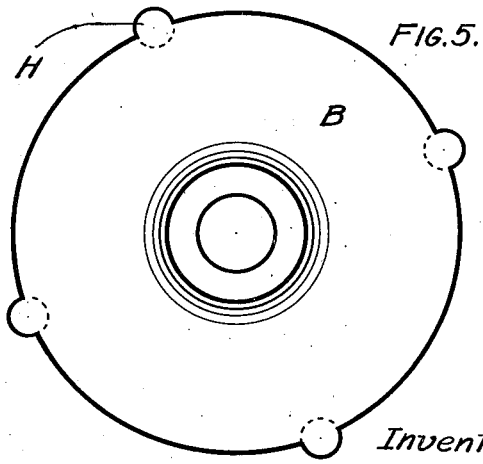

Patented Jan. 5, 1932

1,839,195

UNITED STATES PATENT OFFICE

ADNA GUERNSEY BOWEN, OF MEDINA, NEW YORK

GEAR DIFFERENTIAL

Application filed April 18, 1929. Serial No. 356,152.

My invention relates to a positive drive gearing differential designed to transfer power from a driving shaft to two alined driven shafts in such a manner as to permit one to overrun the other.

The drawings hereto annexed fully illustrate the manner of construction and disclose the way of operation.

In the drawings

Figure 1 is a view in elevation of the assembled differential constituting a preferred embodiment of my invention, one end plate D having been removed to disclose the internal parts thereof;

Fig. 2 is a cross-sectional view on the line 2—2 of Fig. 1, and representing a complete differential unit embodying my invention;

Fig. 3 is a perspective view of one of the pawls constituting a part of my preferred construction;

Fig. 4 is a side and end view of one of the depressible teeth or ratchet members constituting a part of the preferred embodiment of my invention;

Fig. 5 is a face view of the friction plate forming a part of my construction;

Fig. 6 is a fragmentary view in elevation of a portion of one end plate disclosing the bearing provided therein for one end of a pawl; and Fig. 7 is a cross-sectional view of the portion of the end plate shown in Fig. 6, and the end of the pawl to be associated therewith.

Further explaining the function of the several parts and the principle believed to be embodied in the device, the shell B. is normally the power transmitting part and forces the pawls against the resisting depressible teeth of the driven members to drive the driven members along with it, notwithstanding which, either driven members, by reason of having said depressible teeth may overrun the other, the said teeth depressing and passing underneath the pawls: the end plates or flanges retain the other parts of the device in operative position and sustain the whole: the friction plate, acting in conjunction with the shell, controls the behavior of the pawls and causes them to act in unison; this is done by pivoting the pawl at H'. on the nipple H. of the friction plate as shown at H'. and H., and within the recess of the shell, on the pivotal ridge or boss J. against which the bearing J'. bears, so that while the friction plate is held between the two driven members and would adopt their motion except for the restraining nipple H. the slightest relatively reverse movement of the shell causes instant reversal of the position of the pawls and their engagement with the depressible teeth immediately adjacent; and of course, the reversal of the power causes a general reversal of the mechanism, so that again it is the faster moving driven member that overruns.

In the drawings the pawl is shown as having shoulders K. so that they may rest in the bearings K'. This gives smoother action as the pawl is not then affected by the upward pressure at one end of a depressible tooth when the tooth passes under the pawl; they also act as a further safeguard against accident and may be substituted for the pivotal ridge or boss and bearing J. and J'

Claims:

1. A gearless differential comprising a driving shell, driven members coaxially disposed within said shell, and means for connecting said driving shell and said driven members, said means comprising depressible teeth carried by said driven members, a bearing member on the inner surface of said shell, a tooth engaging pawl snugly fulcrumed upon said bearing member and limited to restricted rotary movement thereon, and a plate having a portion engaged with said pawl and a portion frictionally engaged with said driven members.

2. A gearless differential comprising a driving shell, driven members coaxially disposed within said shell, and means for connecting said driving shell and said driven members, said means comprising a radially inwardly extending rib on the inner surface of said shell, a pawl snugly fulcrumed upon said rib and limited to restricted rotary movement thereon, depressible teeth on said driven members engageable by said pawl, and a plate frictionally disposed between said driven members and having a projection snugly received in a depression in said pawl.

3. A gearless differential comprising a driving shell, driven members disposed within said shell, depressible teeth carried by said driven members, a friction plate disposed between said driven members, one or more pawls, each lying within a recess in said driving shell and having clutching portions engageable with said depressible teeth, positive pivotal bearings within said recesses allowing only a limited pivotal movement to each pawl, and means whereby said friction plate controls the limited movement of each pawl.

4. A gearless differential comprising a driving shell, driven members disposed within said shell, depressible teeth carried by said driven members, one or more pawls, each lying within a recess in said driving shell and having clutching portions engageable with said depressible teeth, a pivot member within each recess allowing only a limited pivotal movement to each pawl, and a friction plate disposed between said driven members having a nipple associated with each pawl.

5. A gearless differential comprising a cylindrical driving shell having a plurality of axially extending recesses formed in its inner surface, driven members disposed coaxially within said shell, each of which carries a plurality of depressible teeth, a plate closing each end of said shell and formed with recesses alined with and constituting continuations of the recesses in said shell, a pawl in each of the recesses in said shell, having extensions received in the alined recesses of said flanges and allowed only a limited pivotal movement therein, and a friction plate disposed between said driven members and associated with said pawls for synchronizing and controlling the movements of said pawls.

ADNA GUERNSEY BOWEN.